US009856091B2

(12) United States Patent
Polifke et al.

(10) Patent No.: US 9,856,091 B2
(45) Date of Patent: Jan. 2, 2018

(54) TRANSPORT DEVICE FOR GOODS TO BE TRANSPORTED

(71) Applicant: Optima consumer GmbH, Schwäbisch Hall (DE)

(72) Inventors: Werner Polifke, Schwäbisch Hall (DE); Klaus Lober, Crailsheim (DE); Oliver Kübler, Mainhardt (DE)

(73) Assignee: Optima consumer GmbH, Schwäbisch Hall (DE)

(*) Notice: Subject to any disclaimer, the term of this patent is extended or adjusted under 35 U.S.C. 154(b) by 0 days.

(21) Appl. No.: 15/123,952

(22) PCT Filed: Feb. 25, 2015

(86) PCT No.: PCT/EP2015/053959
§ 371 (c)(1),
(2) Date: Sep. 6, 2016

(87) PCT Pub. No.: WO2015/132108
PCT Pub. Date: Sep. 11, 2015

(65) Prior Publication Data
US 2017/0050806 A1 Feb. 23, 2017

(30) Foreign Application Priority Data
Mar. 5, 2014 (DE) .................. 10 2014 204 045

(51) Int. Cl.
*B65G 25/02* (2006.01)
*B65G 19/02* (2006.01)
*B65G 19/26* (2006.01)

(52) U.S. Cl.
CPC ............. *B65G 25/02* (2013.01); *B65G 19/02* (2013.01); *B65G 19/265* (2013.01)

(58) Field of Classification Search
CPC ........ B65G 25/02; B65G 25/08; B65G 25/10; B65G 25/12; B65G 19/02; B65G 19/26; B65G 19/265

(Continued)

(56) References Cited

U.S. PATENT DOCUMENTS 2,601,785 A * 7/1952 Pottle .................... B65B 7/2807
198/540
3,939,992 A  2/1976 Mikulec
(Continued)

FOREIGN PATENT DOCUMENTS

BE  1015963 A3  12/2005
JP  S5382193 U  7/1978
(Continued)

OTHER PUBLICATIONS

International Search Report issued in connection with PCT/EP2015/053959.

*Primary Examiner* — Mark A Deuble
(74) *Attorney, Agent, or Firm* — Akerman LLP

(57) ABSTRACT

The invention relates to a transport device (1) for goods to be transported, comprising a transport rake (2) with at least one receiving region (20) for the goods to be transported and a slide arrangement (3) which is arranged in a longitudinally slidable manner along a transport plane in a transport direction (I), said slide arrangement (3) being equipped with at least one lever (4) which can be pivoted about a rotational axis (II) oriented substantially perpendicular to the transport plane. The transport rake (2) is mounted on the slide arrangement (3) by means of the at least one lever (4), and a drive device (5) comprising a first drive unit (50) and a second drive unit (51) is provided. A sliding movement of the slide arrangement (3) can be produced by the first drive unit (50), and a pivoting movement of the at least one lever (4) can be produced by means of the second drive unit (51) so that selectively a travel movement of the slide arrangement (3) and the transport rake (2) in the transport direction (I) and/or a plunging movement of the transport rake (2) perpendicularly to the transport direction (I) can be produced by means of a coordinated control of the drive units (50, 51). The invention further relates to a system compris- (Continued)

ing at least one transport device and to a method for operating a transport device for goods to be transported.

11 Claims, 1 Drawing Sheet

(58) Field of Classification Search
USPC .................... 198/736–739, 741, 747, 748
See application file for complete search history.

(56) References Cited

U.S. PATENT DOCUMENTS

| | | | | |
|---|---|---|---|---|
| 4,231,688 | A * | 11/1980 | Wolf | A01F 25/2009 198/737 |
| 4,466,532 | A * | 8/1984 | Minneman | B65G 17/44 198/468.01 |
| 4,735,303 | A * | 4/1988 | Wallis | B65G 25/02 198/621.1 |
| 6,889,485 | B2 * | 5/2005 | Davaillon | B65B 21/06 198/418.7 |
| 8,678,175 | B2 | 3/2014 | Heim et al. | |
| 2012/0048685 | A1 * | 3/2012 | Chen | B65G 25/02 198/750.1 |
| 2012/0222941 | A1 | 9/2012 | Liebhardt et al. | |
| 2016/0280466 | A1 * | 9/2016 | Pospiech | B65G 47/82 |

FOREIGN PATENT DOCUMENTS

| | | |
|---|---|---|
| JP | S57 514 U | 1/1982 |
| JP | H07 115294 A | 5/1995 |

\* cited by examiner

TRANSPORT DEVICE FOR GOODS TO BE TRANSPORTED

This application is a national phase of PCT/EP2015/053959, filed Feb. 25, 2015, and claims priority to DE 10 2014 204 045.0, filed Mar. 5, 2014, the entire contents of which are hereby incorporated by reference.

The invention relates to a transport device for goods to be transported, comprising a transport rake with at least one receiving region for the goods to be transported, and a slide arrangement which is arranged so as to be longitudinally displaceable along a transport plane in a transport direction, wherein at least one lever which is pivotable about a rotation axis oriented substantially perpendicularly to the transport plane is provided on the slide arrangement, and wherein the transport rake is mounted on the slide arrangement by means of the at least one lever. The invention furthermore relates to a machine and to a method for operating a transport device for goods to be transported.

Transport devices are used in lines or machines in order to transport goods to be transported, in particular bottles, cans or other containers, to a station, for example a packaging, sealing, welding, filling, assembling and/or processing station or the like, and/or to transport same away therefrom. What are referred to as transport rakes are known which have a receiving region for the goods to be transported. The goods to be transported are conveyed cyclically by means of a transport rake or, in particular when a plurality of interacting transport rakes are used, are conveyed virtually continuously.

In the context of the application, a movement of the transport rake in the direction of the goods to be transported and away from the goods to be transported is referred to as a plunging movement.

It is known, for a plunging movement, to pivot the transport rake about an axis running parallel to the transport direction.

U.S. Pat. No. 3,939,992 discloses a transport device for a work piece with two interacting transport rakes, wherein goods to be transported are received between two receiving regions of the transport rakes. Each transport rake is mounted on an associated slide arrangement so as to be displaceable in the plunging direction. Two two-armed levers are in each case mounted pivottably on the slide arrangements, wherein a first arm of the lever is in each case coupled to the transport rake and a second arm of the lever to an adjustment device. When an adjustment force is applied to the levers by means of the adjustment device, said levers are pivoted, as a result of which the transport rake carries out a plunging movement until the work pieces are clamped between the transport rakes. If, after the clamping of the work pieces, a further adjustment force is applied, this leads to a movement of the slide arrangement in the transport direction. Similarly, when an adjustment force is applied in an opposite direction, first of all the levers are pivoted to release the work pieces and then the slide arrangement is displaced. Also because of the clamping action, the transport device is unsuitable for fragile goods to be transported. Typically, holding with a permissible play by the transport rake, optionally with a form fit, but without clamping, is required.

It is an object of the invention to provide a transport device with a transport rake, which transport device is suitable for various goods to be transported and which permits a reliable movement of the transport rake at a different plunging depth. Further objects of the invention consist in providing a filling machine with a transport device and a method for operating a transport device.

These objects are achieved by the subject matter having the features of claims 1, 8 and 9. Further advantages of the invention emerge from the dependent claims.

According to a first aspect of the invention, a transport device for goods to be transported, comprising a transport rake with at least one receiving region for the goods to be transported, a slide arrangement which is arranged so as to be longitudinally displaceable along a transport plane in a transport direction, and a drive device with a first drive unit and a second drive unit is provided, wherein at least one lever which is pivotable about a rotation axis oriented substantially perpendicularly to the transport plane is provided on the slide arrangement, the transport rake is mounted on the slide arrangement by means of the at least one lever, a displacement movement of the slide arrangement can be caused by means of the first drive unit, and a pivoting movement of the at least one lever can be caused by means of the second drive unit, and therefore, by means of a coordinated activation of the drive units, a travel movement of the slide arrangement and of the transport rake in the transport direction and/or a plunging movement of the transport rake perpendicularly to the transport direction can be selectively caused.

Thus, a variable plunging depth which is dependent on a pivoting angle of the lever and a length of the lever can be realized. At each plunging depth, the transport rake is suitably oriented with respect to the goods to be transported.

In order, in the event of a plunging movement, to ensure an adjustment movement of a main body of the transport rake without pivoting, a guide which prevents pivoting is provided in one embodiment. In advantageous embodiments, the transport rake is mounted on the slide arrangement by means of at least two levers which are spaced apart and are arranged parallel to each other. The levers have an identical operative length. Thus, a four-bar linkage is provided by the levers and the main body of the transport rake. In one embodiment, the two levers are driven by means of the second drive device. In other embodiments, only one lever is driven, wherein the second lever is moved passively at the same time.

The first drive unit is designed, in one embodiment, as a pneumatic drive, as an electromotive spindle drive and/or as a rack. It is preferably provided that the first drive unit is arranged in a stationary manner and is connected in a driving manner to the slide arrangement by means of a closed-loop first force transmission means. The force transmission means is designed, for example, as a drive cable, as a drive belt, in particular as a flat belt, toothed belt or V belt, or as a chain. By providing such a drive unit, no elements having a high mass and/or large construction space requirement are necessary on the moving slide arrangement. In one embodiment, the force transmission means is mechanically fixedly connected to the slide arrangement. The force transmission means is guided by means of suitable deflecting rollers.

In an embodiment, the second drive unit for the lever is provided on the slide arrangement. In order to avoid the drive unit being carried along on the slide arrangement, the second drive unit is preferably likewise arranged in a stationary manner and is connected to the at least one driving lever by means of a closed-loop second force transmission means. In this case, for a pivoting drive of the lever, at least one force output arrangement which drives the at least one lever and comprises two deflecting rollers and a force output roller, which is arranged between the deflecting rollers and is operatively connected to the at least one lever, is preferably provided on the slide arrangement.

In the case of a design with two closed force transmission means, by means of an activation of the drive units for a synchronous movement of the force transmission means, i.e. a movement in the same direction and at the same speed, a travel movement of the slide arrangement with the transport rake can be caused in the transport direction. By means of a relative movement of the force transmission means with a transmission ratio arising because of the dimensions of the components and/or of the pivoting range, a plunging movement, in particular a linear plunging movement of the transport rake, can be caused perpendicularly to the transport direction. Depending on the design of the force transmission means and/or on a desired plunging movement, a relative movement is caused by an absolute movement of the two force transmission means in the same or in an opposed direction or by a movement of only one force transmission means. In an embodiment, the drive units are operated here in a hierarchical system (master-slave system), wherein the second drive unit is synchronized with the first drive unit.

In preferred embodiments, the slide arrangement comprises at least two slides, wherein the transport rake is in each case mounted on the slides by means of a pivotable lever. A distance between the slides can be suitably defined by a person skilled in the art depending on the size of the transport device and/or of the transport path. In an embodiment, the slides are connected by means of a coupling rod. In this case, preferably only one slide is driven by means of the first drive unit, wherein the second slide is driven by the first slide and the coupling rod. In other embodiments, the two slides are driven by means of the first drive unit, for example are connected fixedly to the force transmission means. A coupling rod can be dispensed with here.

In advantageous embodiments, a respective force output arrangement which drives the lever and comprises two deflecting rollers and a force output roller, which is arranged between the deflecting rollers and is operatively connected to the lever, is provided on the slides. In this case, the levers assigned to the slides are driven by means of a common, closed-loop second force transmission means, and therefore a synchronous movement is ensured. At the same time, the effect achieved by suitable kinematics is that a main body of the transport rake remains oriented parallel to a transport direction when the lever is pivoted.

According to a second aspect, a machine comprising a station, in particular a packaging, sealing, welding, filling, assembling and/or processing station, is provided which has at least one transport device in order to transport a product and/or a container to the station and/or to transport same away from the station. The product is pasty, liquid and/or solid and is preferably arranged in a suitable container for the transport. In an embodiment, the station is designed as a filling station, wherein an empty or only partially filled container is transported by means of a transport device to the station and is transported away from the station after being filled. In an embodiment, the transport device comprises one or more series-arranged transport rakes which interacts (interact) with a railing lying opposite the transport rake or the transport rakes. In other embodiments, mutually opposite transport rakes are provided which together grasp the products and/or the containers.

According to a third aspect, a method is provided for operating a transport device for goods to be transported, wherein the transport device comprises a transport rake with at least one receiving region for the goods to be transported, a slide arrangement which is arranged so as to be longitudinally displaceable along a transport plane in a transport direction and a drive device with a first drive unit and a second drive unit, wherein at least one lever which is pivotable about a rotation axis oriented substantially perpendicularly to the transport plane is provided on the slide arrangement, the transport rake is mounted on the slide arrangement by means of the at least one lever, a displacement movement of the slide arrangement can be caused by means of the first drive unit, and a pivoting movement of the at least one lever can be caused by means of the second drive unit, wherein, according to the method, an optionally coordinated activation of the first drive unit and the second drive unit is carried out in order to produce a travel movement of the slide arrangement with the transport rake in the transport direction and/or a plunging movement of the transport rake.

Preferably, a travel movement of the slide arrangement with the transport rake in the transport direction is caused by means of a synchronous activation of the drive units, and a plunging movement of the transport rake is caused by means of an activation of the drive units with a definable transmission ratio.

Further advantages of the invention emerge from the dependent claims and from the description below of an exemplary embodiment of the invention, which is illustrated schematically in the drawings. Uniform reference signs are used in the drawings for identical or similar components.

Figure 1:
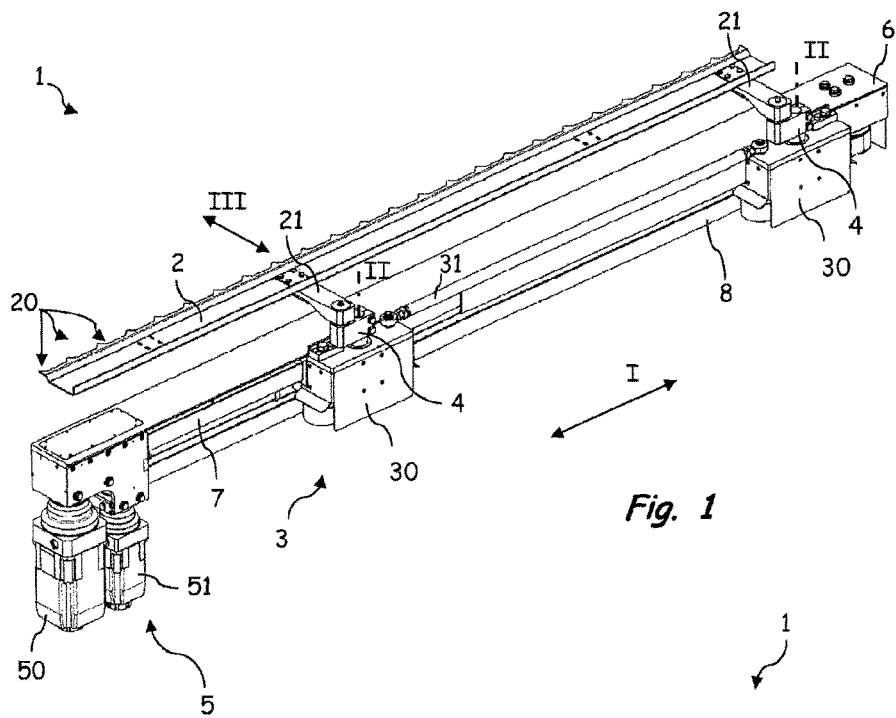
FIG. 1 shows a perspective illustration of a transport device.
Figure 2:
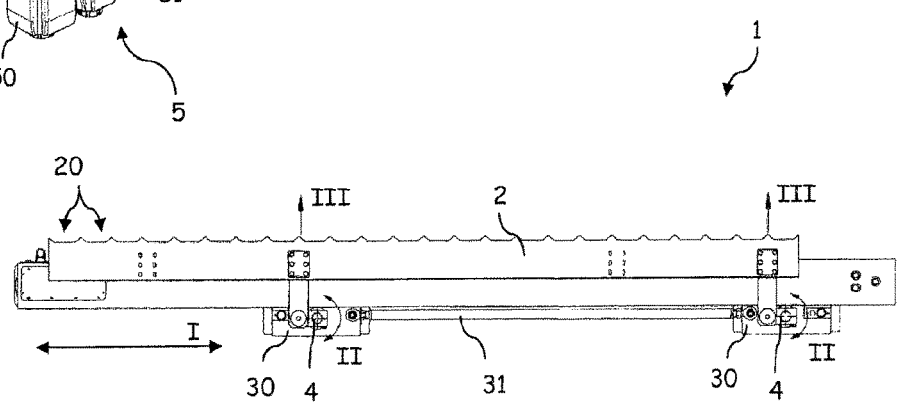
FIG. 2 shows a top view of the transport device according to FIG. 1.

FIGS. 1 and 2 schematically show, in a perspective illustration and a top view, respectively, a transport device 1 for goods to be transported (not illustrated), in particular for containers, such as cans, bottles or the like.

The transport device 1 comprises a transport rake 2 with a plurality of receiving regions 20 for the goods to be transported. The recesses 20 are suitably shaped corresponding to goods to be transported. The illustrated shape is merely by way of example.

Furthermore, the transport device 1 comprises a slide arrangement 3 which is arranged so as to be displaceable longitudinally along a transport plane in a transport direction I, illustrated by a double arrow, and has two slides 30 which are rigidly coupled to each other in the transport direction I via a coupling rod 31.

The transport rake 2 is mounted on the slide arrangement 3, more precisely on the two slides 30, in each case by means of a lever 4. The levers 4 are in each case pivotable about a rotation axis II, which is oriented substantially perpendicular to the transport plane, and are connected in an articulated manner to extension arms 21 arranged on the transport rake 2. The extension arms 21 protrude parallel to each other perpendicularly from a main body of the transport rake 2. A four-bar linkage is produced by the two levers 4 and the main body of the transport rake acting as a coupler, and therefore the main body of the transport rake always remains parallel to the transport direction I when the levers 4 are pivoted.

For movement of the slide arrangement 3 and pivoting of the levers 4, a drive device 5 comprising a first drive unit 50 and a second drive unit 51 is provided. The drive units 50, 51 are in each case designed as electric drive motors which are mounted in a stationary manner on a frame 6.

The first drive unit 50 is connected in a driving manner to the slide arrangement 3, more precisely to one of the slides 30, by means of a closed-loop first force transmission means 7 designed as a drive belt. The slide 30 is fixedly coupled here to the drive belt. The movement of the first slide 30 is transmitted to the second slide 30 by means of the coupling rod 31. The drive belt is guided via suitable deflecting rollers (not illustrated). A displacement movement of the slide arrangement 3 can be produced by means of the first drive unit 50.

A drive of the levers 4 for a pivoting movement is effected by means of the second drive unit 51 and a closed-loop second force transmission means 8 designed as a drive belt.

Figure 3:
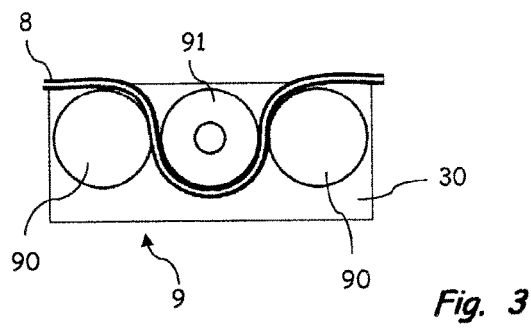
FIG. 3 shows a schematic sectioned top view of a slide of the transport device according to FIG. 1.

FIG. 3 schematically shows a sectioned top view of a slide 30 of the transport device 1 according to FIG. 1. As can be seen in FIG. 3, a respective force output arrangement 9 is provided on each of the slides 30, which drives the lever 4 (not illustrated in FIG. 3) and comprises two deflecting rollers 90 and a force output roller 91 arranged between the deflecting rollers 90. The force output roller 91 is operatively connected to the lever 4 (cf. FIG. 1) of the slide 30. The force output roller 91 is connected to the second drive unit 51 (cf. FIG. 1) by means of the closed-loop second force transmission means 8 designed as a drive belt. The force output roller 91 can therefore be driven and a pivoting movement of the levers 4 produced by means of the second drive unit 51.

By means of a coordinated activation of the drive units 50, 51, a travel movement of the slide arrangement 3 and of the transport rake 2 in the transport direction I or a plunging movement of the transport rake 2, in particular a linear plunging movement of the transport rake 2 in a plunging direction III perpendicular to the transport direction I can optionally be caused.

The drive units 51, 52 and the force transmission means 7, 8 are selected here in such a manner that, for a travel movement of the slide arrangement 3 and of the transport rake 2 in the transport direction I, the two force transmission means 7, 8 are moved synchronously, i.e. at the same speed and in the same direction. For a pivoting movement of the transport rake 2, the drive units 51, 52 are operated in such a manner that the force transmission means 7, 9 carry out a relative movement. In one embodiment, one force transmission means 7, 9 stands idle for a relative movement. In particular, a linear plunging movement in the plunging direction III is possible here by the force transmission means 7, 9 being moved in the same direction, but with a transmission ratio which is dependent on the length of the lever 4 and the diameter of the force output roller 91. The precise setting can be suitably implemented by a person skilled in the art.

The invention claimed is:

1. A transport device for goods to be transported, comprising
   a transport rake with at least one receiving region for the goods to be transported, and
   a slide arrangement which is arranged so as to be longitudinally displaceable along a transport plane in a transport direction (I),
   wherein at least one lever which is pivotable about a rotation axis (II) oriented substantially perpendicularly to the transport plane is provided on the slide arrangement,
   wherein the transport rake is mounted on the slide arrangement by means of the at least one lever,
   wherein a drive device comprising a first drive unit and a second drive unit is provided,
   wherein the first drive unit is arranged in a stationary manner and is connected in a driving manner to the slide arrangement by means of a closed-loop first force transmission means, such that a displacement movement of the slide arrangement can be caused by means of the first drive unit,
   wherein the second drive unit is arranged in a stationary manner and is connected in a driving manner to the at least one lever by means of a closed-loop second force transmission means, such that a pivoting movement of the at least one lever can be caused by means of the second drive unit, and
   wherein by means of a coordinated activation of the drive units, a travel movement of the slide arrangement and of the transport rake in the transport direction (I) and/or a plunging movement of the transport rake perpendicularly to the transport direction (I) can be selectively caused.

2. The transport device as claimed in claim 1, wherein the transport rake is mounted on the slide arrangement by means of at least two levers which are spaced apart and are arranged parallel to each other.

3. The transport device as claimed in claim 1, wherein the first drive unit is arranged in a stationary manner and is connected in a driving manner to the slide arrangement by means of a closed-loop first force transmission means.

4. The transport device as claimed in claim 1, wherein the second drive unit is arranged in a stationary manner and is connected in a driving manner to the at least one lever by means of a closed-loop second force transmission means.

5. The transport device as claimed in claim 4, wherein at least one force output arrangement which drives the at least one lever and comprises two deflecting rollers and a force output roller, which is arranged between the deflecting rollers and is operatively connected to the at least one lever, is provided on the slide arrangement.

6. The transport device as claimed in claim 1, wherein the slide arrangement comprises at least two slides, wherein the transport rake is in each case mounted on the slides by means of a pivotable lever, and wherein the slides are connected by means of a coupling rod.

7. The transport device as claimed in claim 3, wherein a closed-loop first force transmission means and/or a closed-loop second force transmission means are/is designed as a drive belt, drive chain or drive cable pull.

8. A machine comprising a station, in particular a packaging, sealing, welding, filling, assembling and/or processing station and at least one transport device as claimed in claim 1 in order to transport a product and/or a container to the station and/or to transport same away from the station.

9. A method for operating a transport device for goods to be transported, wherein the transport device comprises a transport rake with at least one receiving region for the goods to be transported, a slide arrangement which is arranged so as to be longitudinally displaceable along a transport plane in a transport direction (I) and a drive device with a first drive unit and a second drive unit, wherein at least one lever which is pivotable about a rotation axis (II) oriented substantially perpendicularly to the transport plane is provided on the slide arrangement, the transport rake is mounted on the slide arrangement by means of the at least one lever, a displacement movement of the slide arrangement can be caused by means of the first drive unit, and a pivoting movement of the at least one lever can be caused by means of the second drive unit, the method comprising
an optionally coordinated activation of the first drive unit and the second drive unit in order to cause a travel movement of the slide arrangement with the transport rake in the transport direction and/or a plunging movement of the transport rake.

10. The method as claimed in claim 9, wherein a travel movement of the slide arrangement with the transport rake in the transport direction (I) is caused by means of a synchronous activation of the drive units, and a plunging movement of the transport rake is caused by means of an activation of the drive units with a definable transmission ratio.

11. A transport device for goods to be transported, comprising
a transport rake with at least one receiving region for the goods to be transported, and
a slide arrangement which is arranged so as to be longitudinally displaceable along a transport plane in a transport direction (I),
wherein at least one lever which is pivotable about a rotation axis (II) oriented substantially perpendicularly to the transport plane is provided on the slide arrangement,
wherein the transport rake is mounted on the slide arrangement by means of the at least one lever,
wherein a drive device comprising a first drive unit and a second drive unit is provided,
wherein a displacement movement of the slide arrangement can be caused by means of the first drive unit,
wherein the second drive unit is arranged in a stationary manner and is connected in a driving manner to the at least one lever by means of a closed-loop second force transmission means, such that a pivoting movement of the at least one lever can be caused by means of the second drive unit,
wherein by means of a coordinated activation of the drive units, a travel movement of the slide arrangement and of the transport rake in the transport direction (I) and/or a plunging movement of the transport rake perpendicularly to the transport direction (I) can be selectively caused; and
wherein at least one force output arrangement which drives the at least one lever and comprises two deflecting rollers and a force output roller, which is arranged between the deflecting rollers and is operatively connected to the at least one lever, is provided on the slide arrangement.

\* \* \* \* \*